(No Model.)
I. DOLSEN.
ROAD CART.
No. 300,231. Patented June 10, 1884.
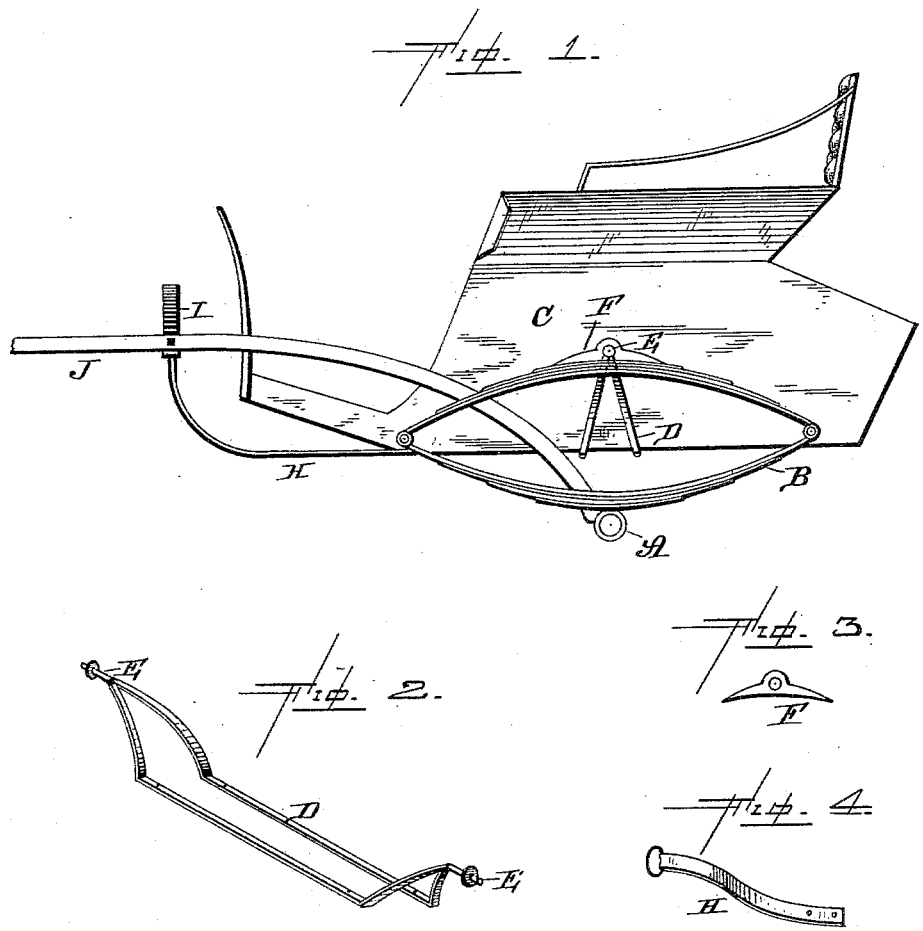
Witnesses.
Louis F. Gardner
J. W. Garner
Inventor.
Isaac Dolsen,
per
F. A. Lehmann,
atty.

UNITED STATES PATENT OFFICE.

ISAAC DOLSEN, OF BEEMERVILLE, NEW JERSEY.

ROAD-CART.

SPECIFICATION forming part of Letters Patent No. 300,231, dated June 10, 1884.

Application filed January 21, 1884. (No model.)

*To all whom it may concern:*

Be it known that I, ISAAC DOLSEN, of Beemerville, in the county of Sussex and State of New Jersey, have invented certain new and useful Improvements in Road-Carts; and I do hereby declare the following to be a full, clear, and exact description of the invention, such as will enable others skilled in the art to which it pertains to make and use it, reference being had to the accompanying drawings, which form part of this specification.

My invention relates to an improvement in road-carts; and it consists in the combination of the axle, the two springs which are secured rigidly thereto on opposite sides of the body, a supporting rod or loop which is secured to the under side of the body, and which has a bearing formed upon each of its ends, saddles which are secured upon the tops of the springs, and through which the bearings of the loop pass, and suitable springs for supporting the front of the body, as will be more fully described hereinafter.

The object of my invention is to suspend the body upon a suitable loop or supporting-rod, which has bearings at each of its ends, the bearings being made to pass through saddles on top of the springs, so that the bearings will turn in the saddles at the same time that the springs that support the front of the body move, and thus allow the body such a free and independent movement of its own as will prevent any of the horse-motion being imparted to it.

Figure 1 is a side elevation of a road-cart embodying my invention. Figs. 2, 3, and 4 are detail views.

A represents an ordinary axle, upon the top of which are rigidly secured the two springs B, which are placed one upon each side of the body C. Secured to the under side of the body, at any suitable point, is the loop or supporting-rod D, the ends of which are turned upward and outward, and which are provided with the bearings E. Upon the top of each one of the springs is secured a suitable saddle, F, through which the ends or bearings E of the loop or supporting-rod pass. The loop or supporting-rod is preferably made double, as shown in Fig. 3, so as to more rigidly brace and support the body. The bearings E pass loosely through the saddles, so as to allow the body to have a tilting or rocking motion in them. The front end of the body is supported by the two flat springs H, which are connected at their front ends by means of loops or other suitable devices, to the cross-bar I of the shafts J. These front springs allow the front portion of the body a suitable movement at the same time that the bearings E turn in their saddles. As the bearings E are free to move in their saddles, and as the front of the body has a slight vertical play from the springs H, all horse-motion is prevented from being imparted to the body, and hence a very pleasant and smooth-riding road-cart is produced.

Having thus described my invention, I claim—

The combination of the body C, the loop or supporting-bar D, which is applied to the under side of the body, and which has its end turned upward and then horizontally outward, with the springs B, which are supported upon the axle, the saddles F, which are secured upon the tops of the springs, and through which the bearings E of the supporting-arm pass, and the springs H, substantially as shown and described.

In testimony whereof I affix my signature in presence of two witnesses.

ISAAC DOLSEN.

Witnesses:
  A. DOLSEN,
  S. N. PUFF.